United States Patent
Veazey et al.

(10) Patent No.: US 7,739,478 B2
(45) Date of Patent: Jun. 15, 2010

(54) MULTIPLE ADDRESS SEQUENCE CACHE PRE-FETCHING

(75) Inventors: Judson E. Veazey, Fort Collins, CO (US); Blaine D. Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 11/683,573

(22) Filed: Mar. 8, 2007

(65) Prior Publication Data

US 2008/0222343 A1    Sep. 11, 2008

(51) Int. Cl.
*G06F 12/00* (2006.01)

(52) U.S. Cl. .......................................... 711/213; 711/3

(58) Field of Classification Search ........................ None
See application file for complete search history.

(56) References Cited

U.S. PATENT DOCUMENTS

| | | | |
|---|---|---|---|
| 5,956,039 A | 9/1999 | Woods et al. | |
| 6,728,840 B1 | 4/2004 | Shatil et al. | |
| 6,772,179 B2 | 8/2004 | Chen et al. | |
| 6,789,171 B2 * | 9/2004 | Desai et al. | 711/137 |
| 6,829,680 B1 | 12/2004 | Sugumar et al. | |
| 6,845,501 B2 | 1/2005 | Thompson et al. | |
| 6,848,028 B1 | 1/2005 | Sugumar et al. | |
| 6,915,404 B1 * | 7/2005 | Desai et al. | 711/204 |
| 6,965,982 B2 | 11/2005 | Nemawarkar | |
| 7,058,636 B2 | 6/2006 | Coldewey | |
| 7,206,902 B2 * | 4/2007 | Hakura et al. | 711/137 |
| 2002/0023139 A1 | 2/2002 | Hultgren | |
| 2003/0004683 A1 * | 1/2003 | Nemawarkar | 702/186 |
| 2003/0126116 A1 | 7/2003 | Chen et al. | |
| 2003/0225977 A1 * | 12/2003 | Desai et al. | 711/137 |
| 2005/0102294 A1 | 5/2005 | Coldewey | |
| 2005/0138627 A1 | 6/2005 | Bradford et al. | |
| 2005/0138628 A1 | 6/2005 | Bradford et al. | |
| 2005/0165746 A1 | 7/2005 | Chakravarty et al. | |
| 2005/0203863 A1 | 9/2005 | Idei et al. | |
| 2006/0041723 A1 * | 2/2006 | Hakura et al. | 711/137 |

* cited by examiner

*Primary Examiner*—Kevin Verbrugge (57) ABSTRACT

A method is provided for pre-fetching data into a cache memory. A first cache-line address of each of a number of data requests from at least one processor is stored. A second cache-line address of a next data request from the processor is compared to the first cache-line addresses. If the second cache-line address is adjacent to one of the first cache-line addresses, data associated with a third cache-line address adjacent to the second cache-line address is pre-fetched into the cache memory, if not already present in the cache memory.

24 Claims, 7 Drawing Sheets

MULTIPLE ADDRESS SEQUENCE CACHE PRE-FETCHING

BACKGROUND OF THE INVENTION

Throughout the development of modern computer systems, one important facet of system performance has been memory access time. While reducing access times to the actual memory devices, such as dynamic random access memories (DRAMs), has had a profound effect on system throughput, architectural advances have also increased memory system performance. Perhaps the most important of these advances is the use of cache memory residing between a processor and a main memory of the computer system.

Generally, a cache memory resides in a memory system hierarchy between one or more processors and a main memory. The cache is relatively small and fast memory compared to the main memory and holds copies of a portion of the data residing within the main memory address space. Since the cache is smaller than the main memory, the cache is not capable of holding all of the data that may reside in the main memory. Instead, the cache typically is designed to hold data which the processor most often accesses. Moreover, multiple cache levels are often employed between the processor and the main memory, with higher levels of cache (i.e., those cache levels located closer to the processor) being relatively smaller and faster than lower cache levels. As an example, the use of three or four cache levels in commercial computing systems is now commonplace.

Typically, data is stored within the cache memory in response to the processor reading data from the main memory. As the data passes through the cache, the data may be stored therein so that subsequent requests for the same data may be satisfied via the cache instead of the slower main memory. In other cases, data written by the processor to the main memory may be stored in the cache as it passes to the main memory. Given the limited amount of storage space within the cache, any of several caching algorithms, such as "least recently used" (LRU) and "least frequently used" (LFU), have been devised to determine which data is to be stored in the cache, and which is to be discarded. The primary goal of such an algorithm is to maximize the cache "hit ratio," or the percentage of processor read requests for data that the cache may satisfy.

To further increase computer system performance, some caching memory systems utilize "pre-fetching." More specifically, rather than wait for the processor to request data before retrieving that data from the main memory and storing it in the cache, the memory system may retrieve the data from the main memory and store it in the cache prior to the processor requesting the data, thus eliminating the latency between the request and the storing of the data in the cache. To implement pre-fetching, caching memory systems often presume data requests will follow in a linear or sequential fashion, continuing with the next memory address following the most recent data request.

Unfortunately, many data access patterns do not follow a linear or sequential pattern. For example, multiple software threads may be executing on one or more processors coupled with the memory system. Under that scenario, each thread may be requesting data in a sequential fashion, but when the requests are received concurrently and collectively at the memory system, the sequential nature of the memory accesses of each separate thread is not apparent. One example of a system executing several such software threads is a relational database decision-support server. Queries to a relational database are often processed by multiple software threads executing concurrently, with each thread accessing a separate database "relation," or table, often combining the data from the tables in an operation called a "join." However, while each thread may retrieve data sequentially from the system address space, the memory system may only see memory requests that spatially appear to be at least somewhat random, thus defeating any potential benefit from a standard pre-fetching algorithm.

DETAILED DESCRIPTION OF THE INVENTION

Figure 1:
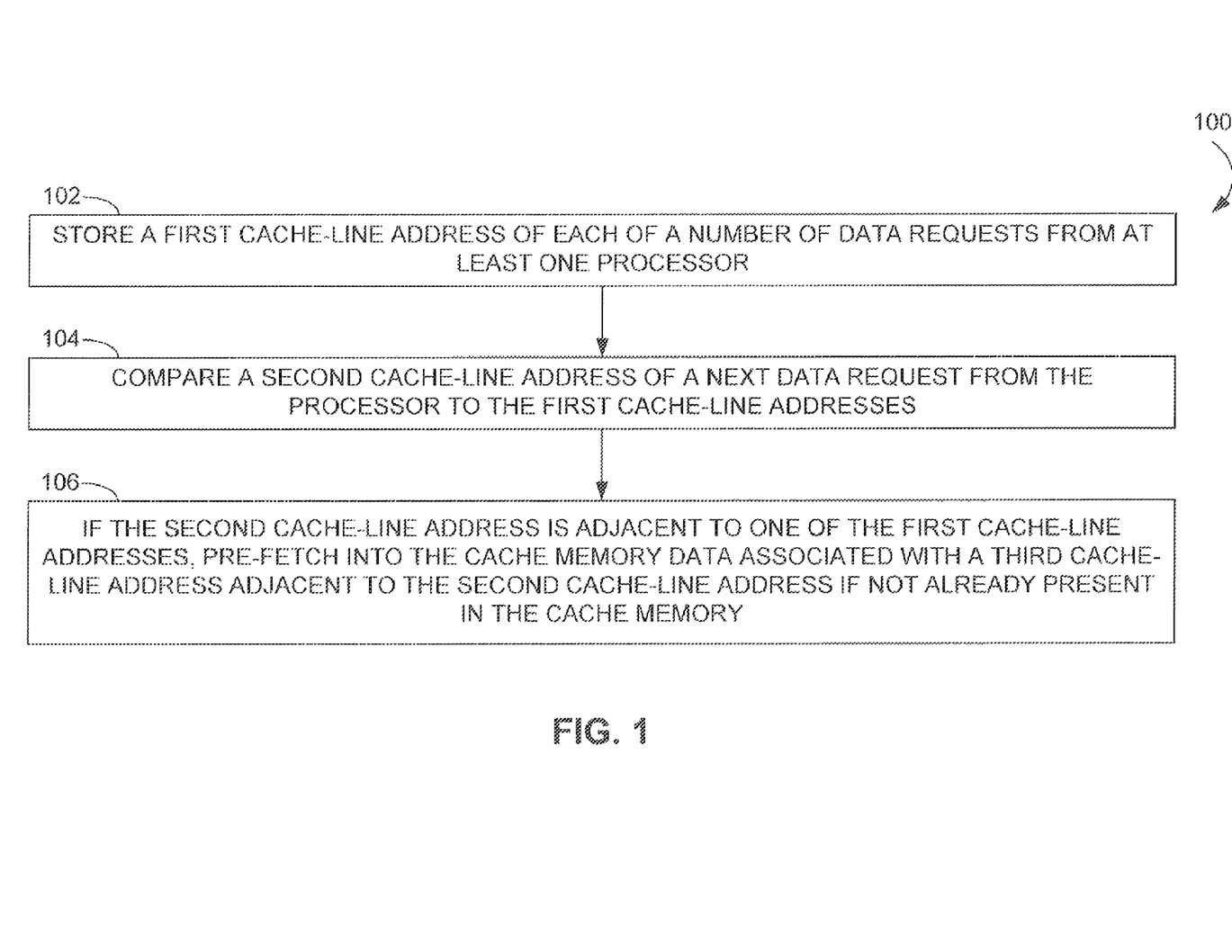
FIG. 1 is a flow diagram of a method according to an embodiment of the invention for pre-fetching data into a cache memory.

One embodiment, a method 100 of pre-fetching data into a cache memory, is shown by way of the flow diagram of FIG. 1. In the method 100, a first cache-line address of each of a number of data requests from at least one processor is stored (operation 102). A second cache-line address of a next data request from the processor is compared to the first cache-line addresses (operation 104). If the second cache-line address is adjacent to one of the first cache-line addresses, data associated with a third cache-line address adjacent to the second cache-line address is pre-fetched into the cache memory if not already present in the cache memory (operation 106).

Figure 2:
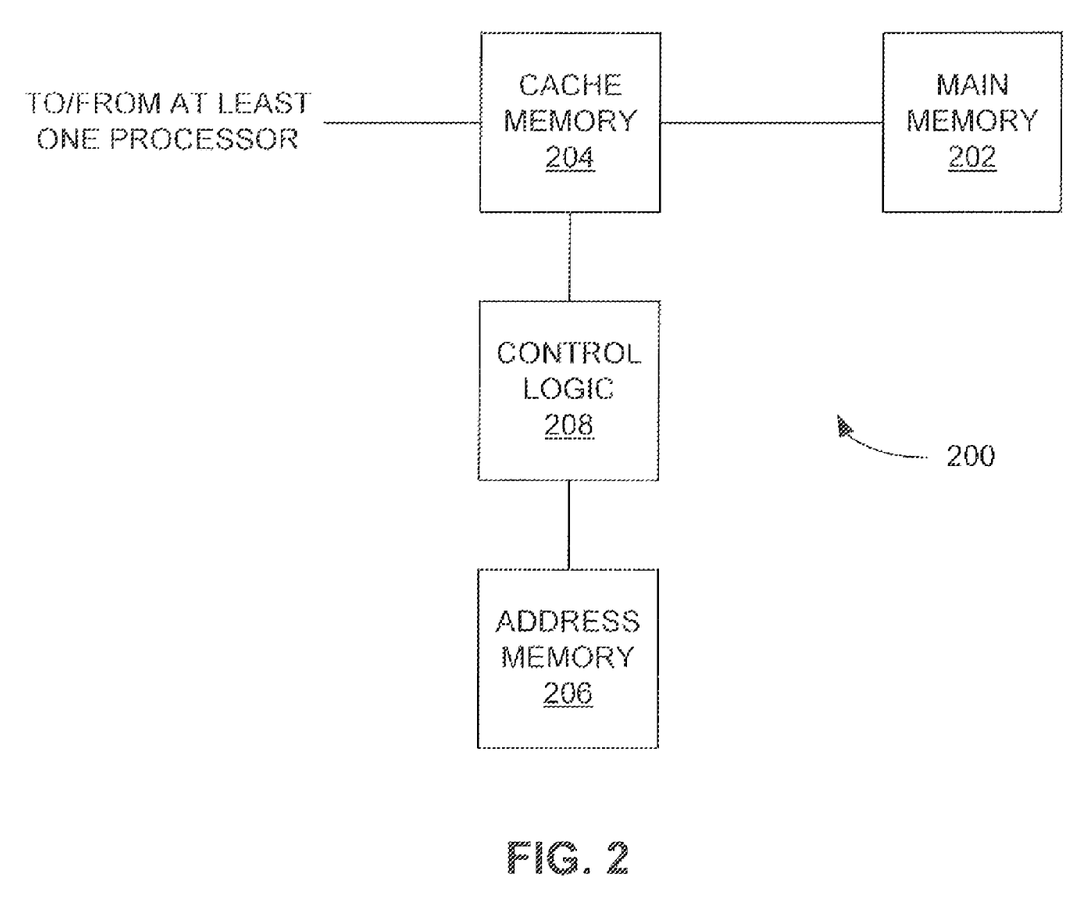
FIG. 2 is a block diagram of a caching memory system according to an embodiment of the invention.

FIG. 2 illustrates another embodiment by way of block diagram: a caching memory system 200 including a main memory 202, a cache memory 204, an address memory 206 configured to hold a number of cache-line addresses associated with the cache memory 204, and control logic 208. The cache memory 204 is coupled with both the main memory 202 and at least one processor (not shown). The control logic 208 is configured to store a first cache-line address of each of a plurality of data requests from the processor into the address memory 206. The control logic 208 is also configured to compare a second cache-line address of a next data request from the processor to the first cache-line addresses. If the second cache-line address is adjacent to one of the first cache-line addresses, the control logic 208 pre-fetches data associated with a third cache-line address adjacent to the second cache-line address into the cache memory 204, if the data is not already present in the cache memory 204.

Figure 3A:
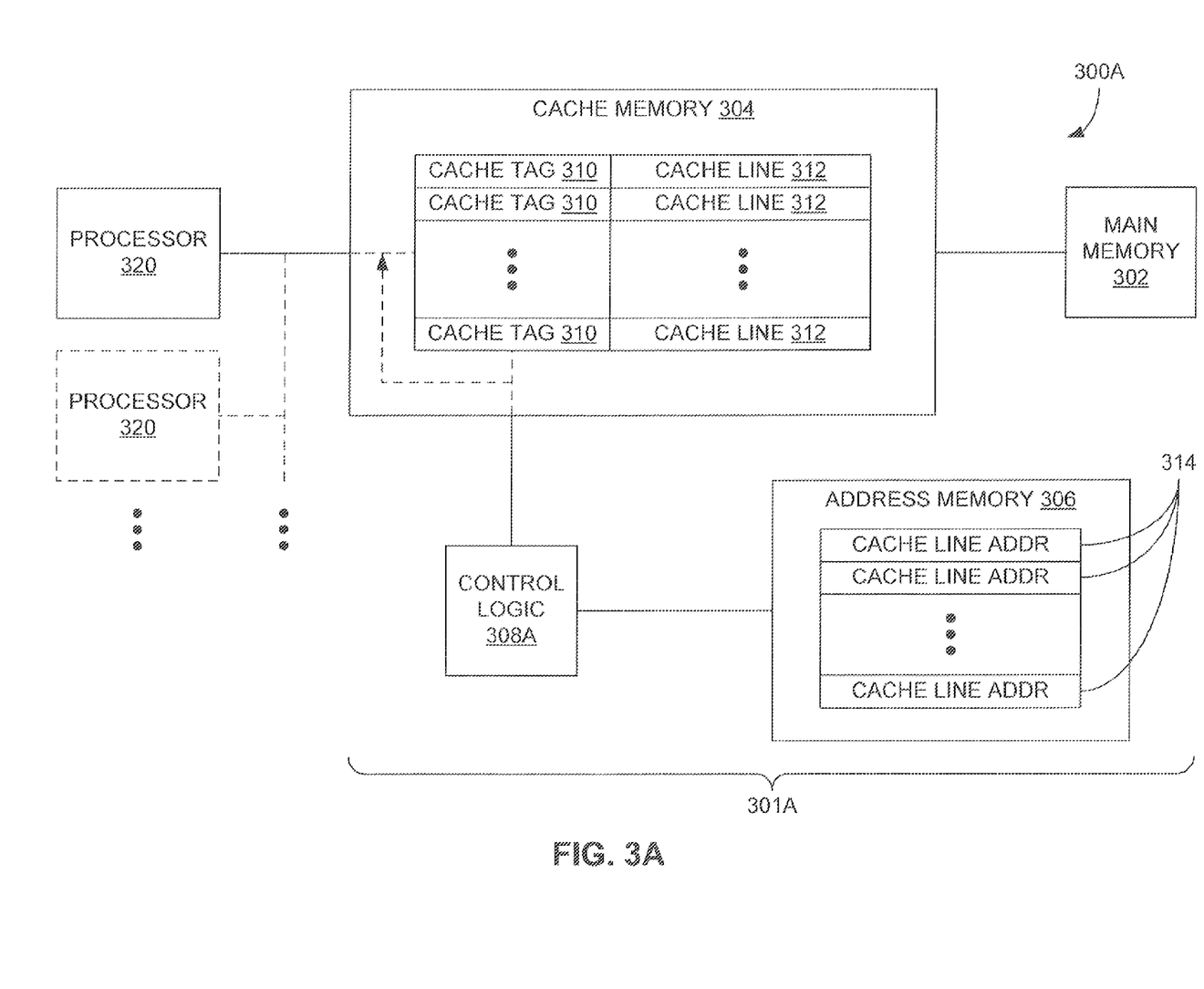
FIG. 3A is a block diagram of a computer system including a caching memory system according to another embodiment of the invention, wherein control logic of the system is coupled between a cache memory and a processor.

FIG. 3A illustrates a particular embodiment of a computer system 300A including a caching memory system 301A coupled with one or more processors 320. Each processor 320 possesses the ability to execute instructions and/or process data that may be stored in the caching memory system 301A. In another embodiment, one or more of the processors 320 may also include local memory stores for instructions or data. Other components of the computer system 300A that may be coupled to the processors 320, such as input/output devices, nonvolatile data storage devices, and the like, are not illustrated in FIG. 3A to promote clarity in the following discussion.

The caching memory system 301A of FIG. 3A includes both a main memory 302 and a cache memory 304 located between the main memory 302 and the processors 320. Also included in control logic 308A coupled with the cache memory 304 and an address memory 306 coupled with the control logic 308A. The functionality of the control logic 308A and the address memory 306 are described in greater detail below.

Not shown, but potentially included, in the caching memory system 301A is a memory controller coupled between the one or more processors 320 and the cache memory 304. The memory controller may be configured to appropriately direct memory access requests from the processor 320 to the cache memory 304, a memory local to the processor 320, or another region of memory within the computer system 300A.

The main memory 302 may be any random access memory suitable for the computer system 300A, including, but not limited to, dynamic random access memory (DRAM) integrated circuits (ICs) and static random access memory (SRAM) ICs. Further, the main memory 302 may be organized as one or more single in-line memory modules (SIMMs), dual in-line memory modules (DIMMs), or any other type of RAM organization.

The cache memory 304 contains an amount of random-access memory which is typically smaller and faster than that of the main memory 302. In one embodiment, the cache memory 304 is packaged in ICs or modules that are physically separate from the one or more processors 302. In another implementation, the cache memory 304 may be co-located on the same IC as, or "on-board" with, the one or more processors 320. Other embodiments may incorporate multiple levels of cache memory 304 (not shown in FIG. 3A) between the main memory 302 and the processors 320. In that example, one or more of the cache memories 304 may each have separate control logic 308A and accompanying address memory 306 associated therewith.

The cache memory 304 includes a number of cache lines 312, wherein each cache line 312 may contain a copy of a set of contiguous addressable memory locations within the main memory 302. Typically, a particular line of data from the main memory 302 may be placed in one or more of the cache lines 312 according to any of a number of mapping schemes, such as direct mapping, set-associative mapping, fully-associative mapping, and the like. Also, the cache memory 304 may employ any of a number of cache replacement algorithms, such as "least recently used" (LRU), "least frequently used" (LFU) and others, to determine where incoming data from the main memory 302 is to be placed, and which cache lines 312 within the cache memory 304 are to be replaced, updated, or discarded.

Logically associated with each cache line 312 is a cache tag 310 specifying information identified with the cache line 312. For example, each cache tag 310 includes an address of the associated cache line 312, which typically represents a portion of the address of that data within the main memory 302. More specifically, since each cache line 312 typically includes more than one addressable memory location within the main memory 302, the associated address of the cache line 312 will require fewer bits than the corresponding address within the main memory 302. For example, if each cache line 312 is organized into 128 (i.e., $2^7$) bytes, and each byte is individually addressable in the main memory 302, then the cache-line address within each cache tag 310 will be seven bits shorter than each main memory 302 address.

Also included in each cache tag 310 may be one or more status bits indicating the status of the corresponding cache line 312. For example, depending on the specific cache coherency protocol employed within the cache memory 304, the status bits may indicate whether the cache line 312 is "modified," "owned," "exclusive," "shared," or "invalid." These states, or some subset thereof, are often used in caches which employ a Modified-Owned-Exclusive-Shared-Invalid (MOESI) cache protocol, a Modified-Owned-Shared-Invalid (MOSI) protocol, a Modified-Exclusive-Shared-Invalid (MESI) protocol, a Modified-Shared-Invalid (MSI) protocol, or another protocol, depending on the specific cache line states supported within the caching memory system 301A.

The control logic 308A, by way of its coupled address memory 306, is configured to initiate pre-fetching operations, by which data from the main memory 302 is preloaded into the cache memory 304 before being specifically requested by one of the processors 320. To this end, the address memory 306 may include two or more registers 314 or other memory structures, each of which is configured to hold a cache-line address associated with a memory access request from one of the processors 320. More than one cache-line address is saved in the address memory 306 to provide a recent history of the data requests from the processor 320 to help determine what, if any, data should be pre-fetched from the main memory 302.

In one embodiment, the address memory 306 is configured as a first-in, first-out (FIFO) memory so that the oldest cache-line addresses stored within the address memory 306 are discarded in favor of the most recent cache-line addresses stored to the address memory 306. In another implementation, the address memory 306 may be read as a content-addressable memory (CAM) so that comparisons between each of the cache-line addresses and the cache-line address of data associated with a data request from one of the processors 320 may occur substantially in parallel, thus expediting the comparison. In another embodiment, the address memory 306 may be configured as both a FIFO memory and a CAM to allow retention of the most recent cache-line addresses while also facilitating expedited comparisons involving those addresses.

In the embodiment presented in FIG. 3A, the control logic 308A is coupled by way of the cache memory 304 to the cache tags 310 and the data requests from the processors 320 as they are received at the cache memory 304. This location of the control logic 308A may be described as being "in front of" the cache memory 304. In another embodiment of the computer system 300B, depicted in FIG. 3B, a caching memory system 301B employs a control logic 308B which operates in a manner similar to the control logic 308A, except that the control logic 308B is coupled to the cache memory 304 to detect data requests from the processors 320 as they leave the cache memory 304 bound for the main memory 302. Such positioning of the second control logic 308B, which may be termed as being "behind" the cache, dictates a slightly different operation therein compared to that of the first control logic 308A.

Figure 4A:
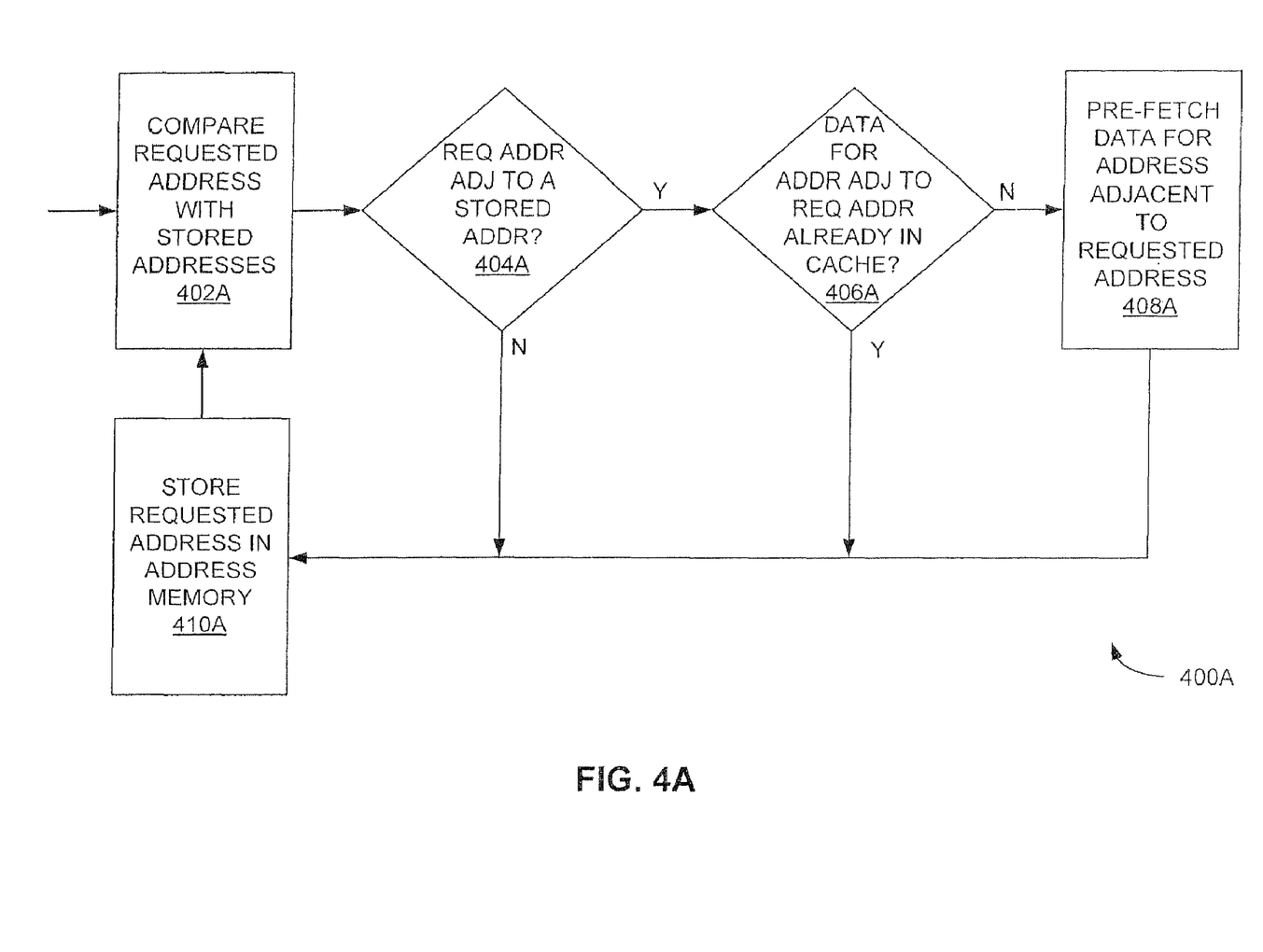
FIG. 4A is a flow diagram of a method according to an embodiment of the invention for pre-fetching data within the caching memory system of FIG. 3A.

FIG. 4A provides a flow diagram describing a method 400A of operating the first control logic 308A of the computer system 300A of FIG. 3A. First, the control logic 308A compares a cache-line address associated with an incoming data request from the one or more processors 320 to each of the cache-line addresses 314 stored in the address memory 306 (operation 402A). Initially, the address memory 306 is presumed empty, so the comparison in that particular case is trivial. Since the control logic 308A is coupled in front of the cache memory 304, the control logic 308A views each data request originating from the processors 320, whether or not the requested data is already residing within the cache memory 304.

If the cache-line address of the requested data is adjacent in the address space to one of the cache-line addresses stored in the registers 314 of the address memory 306 (operation 404A), the control logic 308A then determines if data associated with another cache-line address adjacent to the requested cache-line address already resides within the cache memory 304 (operation 406A). In one embodiment, the control logic 308A makes this determination by comparing the other cache-line address with the cache tags 310 of the cache memory 304. This comparison may be facilitated by implementing the address memory 306 as a content-addressable memory (CAM) so that the comparison with the contents of each of the registers 314 may occur substantially simultaneously. If a match is found, no pre-fetch is performed, since such an action would cause unnecessary consumption of bandwidth between the main memory 302 and the cache memory 304. If, instead, a match is not found, then the control logic 308A causes the data associated with the cache-line address adjacent to the requested cache-line address to be pre-fetched from the main memory 302 into the cache memory 304 (operation 408A).

In one embodiment, the requested cache-line address adjacent to the stored cache-line address is the cache-line address which sequentially follows the stored cache-line address. Accordingly, the other cache-line address adjacent to the requested cache-line address is the cache-line address sequentially following the requested cache-line address. Such an embodiment may be preferred if data requests from the processors 320 tend to follow an incrementing address pattern. If, instead, data requests progressing from higher to lower addresses are expected, the control logic 308A may determine if the requested cache-line address immediately precedes the stored cache-line address to decide if pre-fetching is warranted. As a result, the address of the cache-line to be pre-fetched immediately precedes the requested cache-line address. In yet another embodiment, adjacency of one cache-line address to another is satisfied if one immediately follows or precedes another.

The control logic 308A then stores the cache-line address associated with the requested data into one of the registers 314 of the address memory 306 (operation 410A). In one embodiment, the cache-line addresses are stored in the address memory 306 in a FIFO or circular fashion so that the address associated with the oldest data request is replaced by the address corresponding to the most recent data request. After this latest requested cache-line address is stored in the address memory 306, the control logic 308A processes the next data requested by the processors 320 by comparing its cache-line address to the stored cache-line addresses of the address memory 306, as described above (operation 402A). The process then continues in a cyclical fashion for each data requested by the processors 320.

FIGS. 5A-5E illustrate the contents of the registers 314 within the address memory 306 for a particular series of data requests from the one or more processors 320 with cache-line addresses, in order, of 22, 13, 45, 14, 46, 23 and 15. In this specific example, the control logic 308A is configured to determine if a new request is associated with a cache-line address that immediately follows a previously-stored cache-line address. The particular cache-line addresses shown in FIGS. 5A-5E represent much shorter addresses than is typically employed in a caching memory system to facilitate the discussion below. For example, presume main memory 302 represents one terabyte (1 TB), or $2^{40}$ bytes, of total address space, thus requiring 40 address bits. Presuming also that each cache-line includes 128, or $2^7$, data bytes. In that particular case, each cache-line address would require 40-7, or 33 address bits. Also, while the particular address memory 306 of FIGS. 5A-5E provides four registers 314, other embodiments may include more or fewer such registers 314.

Figure 5A:
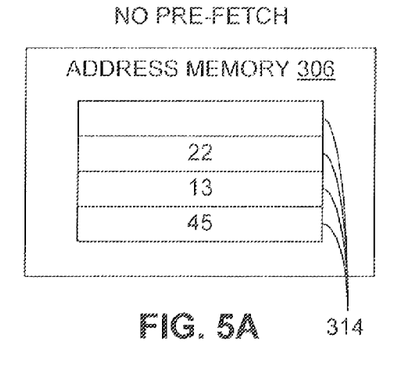
FIGS. 5A-5E graphically depicts the contents of an address memory of a caching system according to an embodiment of the invention in operation.

In operation, the first three data requests are associated with cache-line addresses of 22, 13 and 45, each of which is placed in FIFO order within the registers 314 of the address memory 306, as shown in FIG. 5A. Each of these addresses is stored whether or not the data is located in the cache memory 304. As none of these addresses is adjacent to each other, no pre-fetch of data from the main memory 302 is attempted.

Figure 5B:
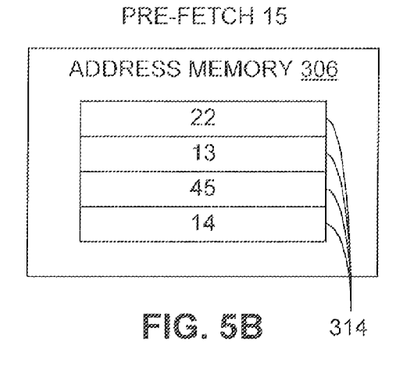

As indicated in FIG. 5B, the next data request from one of the processors 320 corresponds to a cache-line address of 14, which sequentially follows the stored cache-line address of 13. Accordingly, the control logic 308A causes a pre-fetch of the data having a cache-line address of 15 (i.e., the address immediately following the cache-line address of the data request for cache-line address 14) from the main memory 302 into the cache memory 304. Prior to initiating the pre-fetch operation, the control logic 308A may check the cache tags 310 of the cache memory 304 to ensure that the data to be pre-fetched is not already located in one of the cache lines 312 of the cache memory 304. The cache-line address of 14 is stored in the next available register 314 of the address memory 306. However, the cache-line address of 15, identified with the pre-fetched data, may not be placed in the address memory 306, as that data has not yet been requested by one of the processors 320.

Figure 5C:
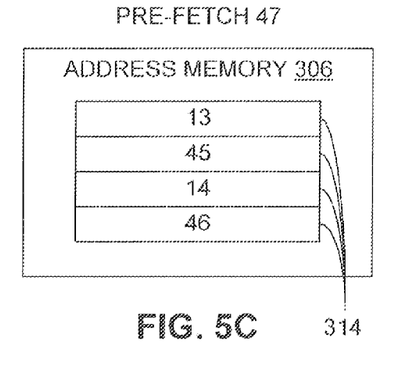

Continuing with FIG. 5C, the next data request from one of the processors 320 possesses a cache-line address of 46. In response to this data request, the control logic 308A determines that the requested cache-line address immediately follows the address of 45 already stored in one of the registers 314 of the address memory 306. Presuming the data associated with the next cache-line address of 47 is not already located in the cache memory 304, the control logic 308A causes a pre-fetch of that data from the main memory 302 in the cache memory 304. The control logic 308A also stores the cache-line address of 46 into a register 314 of the memory address 306. Since all of the registers 314 are full, the oldest stored cache-line address of 22 is discarded as a result of storing the newest cache-line address. In another implementation not represented in FIGS. 5A-5E, the cache-line address associated with the data request (in this case, address 46) may instead directly replace the cache-line address in the address memory 306 which it immediately follows (in other words, address 45). While this particular embodiment does not operate the address memory 306 in a strict FIFO fashion, space with the address memory 306 may be utilized more efficiently as a result, possibly allowing pre-fetching for a higher number of execution threads.

Figure 5D:
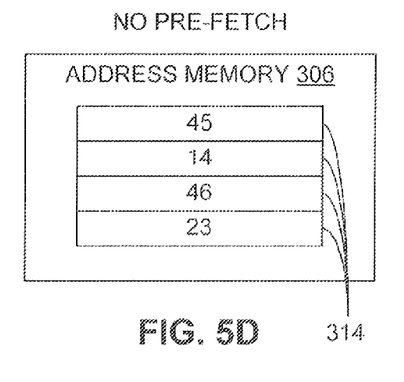

As shown in FIG. 5D, the next data request is associated with a cache-line address of 23. Even though the address of 22 was previously stored in the memory address 306, as depicted in FIGS. 5A and 5B, that address has since been shifted or discarded from the registers 314. As a result, the requested cache-line address of 23 is not found to immediately follow any of the cache-line addresses stored in the address memory 306, and no pre-fetch operation is initiated as a result. In another embodiment in which at least six registers 314 are provided within the address memory 306, the previously-stored address of 23 wound instead remain in the address memory 306, thus allowing the data of the next cache-line address of 24 to be pre-fetched. As before, the requested cache-line address of 23 is stored in the next available register 314, thus causing the removal of the oldest address of 45 from the address memory 306.

Figure 5E:
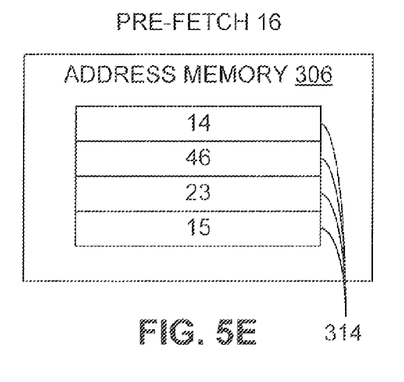

At FIG. 5E, the next data request from the processors 320 has a cache-line address of 15, which was previously pre-fetched into the cache memory 304, and is therefore quickly accessible by the requesting processor 320. In addition, since the requested cache-line address of 15 immediately follows the stored cache-line address of 14 in the address memory 306, the data for cache-line address 16 is pre-fetched from the main memory 302 into the cache memory 304, presuming a copy of that data is not already located within the cache memory 304. Again, the requested cache-line address of 15 is also stored into the address memory 306. The control logic 308A then processes each subsequent data request from the processors 320 in the same manner as described above.

In the example of FIGS. 5A-5E, previous caching memory systems anticipating a single execution thread are not likely to pre-fetch any data in light of the given cache-line address order (i.e., 22, 13, 45, 14, 46, 23 and 15, shown above), since no two consecutive addresses in the sequence are adjacent to each other in the address space. However, by way of the four-register 314 address memory 306, potential pre-fetching opportunities are exploited, as at least two address sequences (i.e., 13, 14, and 15, as well as 45 and 46) are detected. A third sequence (22 and 23) may be detected in this specific example if at least six registers 314 are employed in the address memory 306, as discussed earlier. Such a combination of address sequences may be experienced, for example, in a single processor 320 system processing multiple execution threads, or a system including multiple processors 320 each performing one or more such threads. Further, while such processing workloads are often associated with a database decision-support computer server, as described above, myriad other multi-threaded workloads or tasks may also benefit from application of various embodiments of the invention.

Figure 3B:
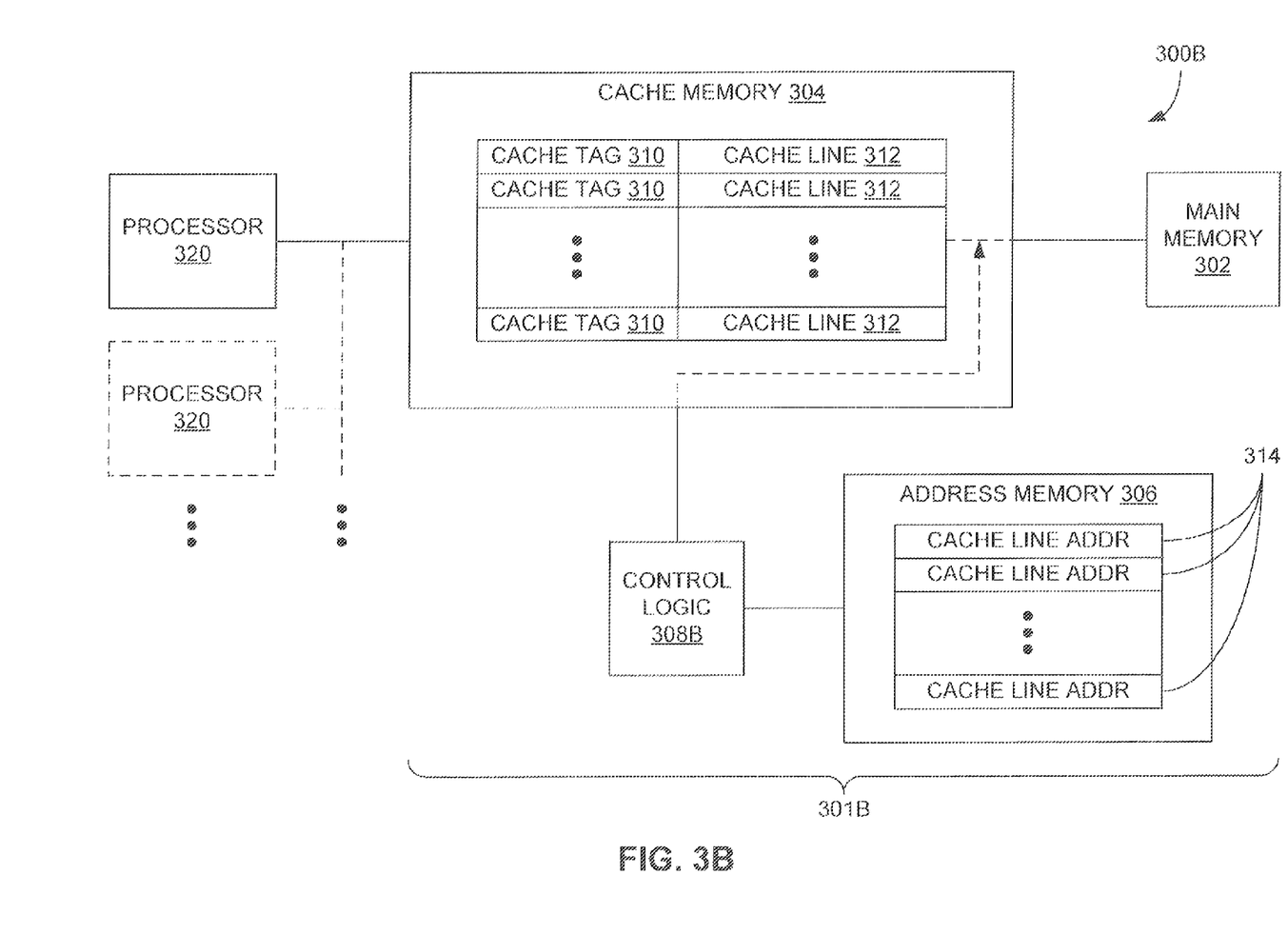
FIG. 3B is a block diagram of a computer system including a caching memory system according to another embodiment of the invention, wherein control logic of the system is coupled between a main memory and the cache memory.
Figure 4B:
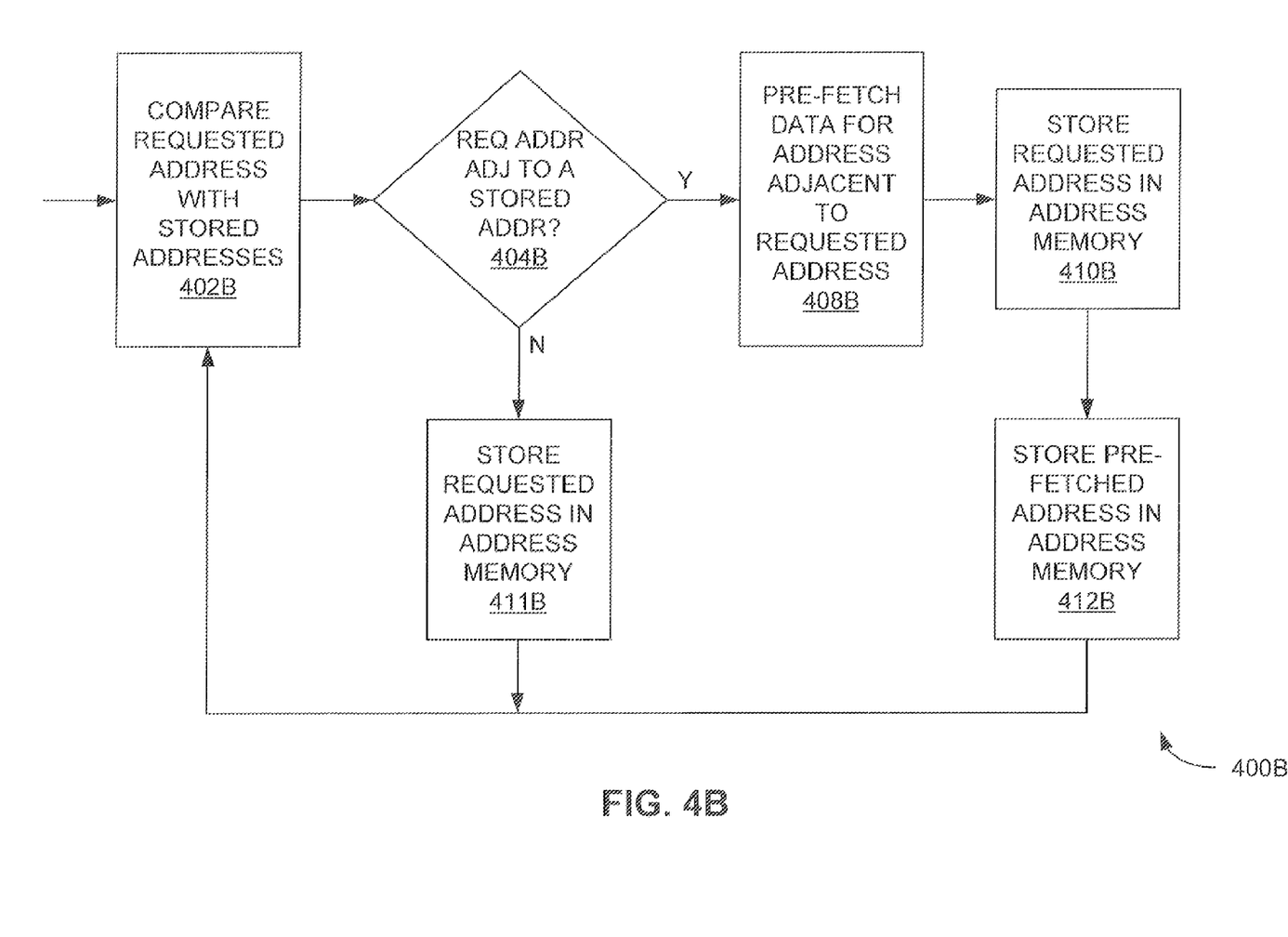
FIG. 4B is a flow diagram of a method according to an embodiment of the invention for pre-fetching data within the caching memory system of FIG. 3B.

Another embodiment of a similar computer system 300B including one or more processors 320 and a caching memory system 301B is depicted in FIG. 3B. In contrast to the architecture of FIG. 3A, in which the control logic 308A is coupled in front of the cache memory 304, the computer system 300B includes control logic 308B coupled behind the cache memory 304. FIG. 4B depicts a method 400B for operating the control logic 308B. Like the control logic 308A, the control logic 308B compares the cache-line address of each data request from the processors 320 with cache-line addresses previously stored in the address memory 306 (operation 402B) and determines if the requested cache-line address is adjacent to one of the stored cache-line addresses (operation 404B). However, as a result of the control logic 308B being coupled behind the cache, cache hits to the cache memory 304 are masked or hidden from the control logic 308B, as cache hits do not result in data accesses between the main memory 302 and the cache memory 304. Consequently, the reading of the cache tags 310, as employed by the control logic 308A in FIG. 3A to prevent pre-fetching of data already located in the cache memory 304 (operation 406A of FIG. 4A) is not required since the control logic 308B does not detect any cache hits. As a result, if a match is found, the control logic 308B may instead proceed to pre-fetching data associated with the cache-line address adjacent to the requested cache line address (operation 408B). The control logic 308B then stores the cache-line address of the requested data in one of the registers 314 of the address memory 306 (operations 410B and 411B).

However, since cache hits are eliminated from consideration by the control logic 308B, the control logic 308B is not able to consider all of the processor 320 data requests, possibly resulting in lost pre-fetching opportunities. To at least partially address this issue, the control logic 308B may be configured in one embodiment to store the cache-line address of data pre-fetched from the main memory 302 before such data is actually requested from the processors 320 (operation 412B), as such a subsequent data request will not be visible to the control logic 308B since a cache hit will result.

While several embodiments of the invention have been discussed herein, other embodiments encompassed by the scope of the invention are possible. For example, while some embodiments of the invention as described specifically within the context of a caching memory system employing a single cache level, other systems employing multiple cache levels can benefit from application of the principles discussed herein to one or more of the cache levels of a single computer system. Also, while specific types of cache memories, such as those employing a particular replacement algorithm, mapping scheme, or cache coherency protocol, are discussed above, any type of cache memory system may be utilized in conjunction with the various embodiments of the control logic and address memory discussed herein. Further, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method of pre-fetching data into a cache memory, comprising:
   storing, in an address memory, a first cache-line address of each of a plurality of data requests from at least one processor;
   comparing, by control logic, a second cache-line address of a next data request from the at least one processor to the first cache-line addresses, wherein the control logic is connected behind the cache memory such that the control logic is able to detect the next data request if the next data request resulted in a cache miss at the cache memory, but the control logic is unable to detect the next data request if the next data request resulted in a cache hit at the cache memory; and
   if the second cache-line address of the next data request detected by the control logic is adjacent to one of the first cache-line addresses, the control logic pre-fetching into the cache memory data associated with a third cache-line address adjacent to the second cache-line address.

2. The method of claim 1, further comprising storing, by the control logic, the second cache-line address that resulted in a cache miss as one of the first cache-line addresses in the address memory.

3. The method of claim 1, further comprising storing the second cache-line address that resulted in a cache miss into the address memory by replacing one of the first cache-line addresses in the address memory with the second cache-line address.

4. The method of claim 1, wherein:
   the second cache-line address sequentially follows the one of the first cache-line addresses; and
   the third cache-line address sequentially follows the second cache-line address.

5. The method of claim 1, wherein:
   the second cache-line address sequentially precedes the one of the first cache-line addresses; and
   the third cache-line address sequentially precedes the second cache-line address.

6. The method of claim 1, wherein the first cache-line addresses are stored in the address memory that is a first-in, first-out queue.

7. The method of claim 1, wherein the first cache-line addresses are stored in the address memory that is a content-addressable memory.

8. The method of claim 1, wherein the first cache-line addresses of the plurality of data requests are stored in the address memory in response to each of the plurality of data requests resulting in a cache miss at the cache memory.

9. A computer-readable storage medium comprising instructions executable in a computer system for performing the method of claim 1.

10. A caching memory system, comprising:
a main memory;
a cache memory coupled to the main memory and configured to be coupled to at least one processor;
an address memory configured to hold a plurality of cache-line addresses associated with the cache memory; and
control logic configured to:
store a first cache-line address of each of a plurality of data requests from the at least one processor into the address memory, where each of the data requests resulted in a cache miss at the cache memory;
compare a second cache-line address of a next data request from the at least one processor to the first cache-line addresses, wherein the control logic is connected behind the cache memory such that the control logic is able to detect the next data request if the next data request resulted in a cache miss at the cache memory, but the control logic is unable to detect the next data request if the next data request resulted in a cache hit at the cache memory; and
if the second cache-line address of the next data request detected by the control logic is adjacent to one of the first cache-line addresses, pre-fetch into the cache memory data associated with a third cache-line address adjacent to the second cache-line address.

11. The caching memory system of claim 10, wherein the control logic is further configured to store the second cache-line address that resulted in a cache miss into the address memory as one of the first cache-line addresses.

12. The caching memory system of claim 10, wherein the control logic is further configured to replace the one of first cache-line addresses in the address memory with the second cache-line address that resulted in a cache miss.

13. The caching memory system of claim 10, wherein:
the second cache-line address sequentially follows the one of the first cache-line addresses; and
the third cache-line address sequentially follows the second cache-line address.

14. The caching memory system of claim 10, wherein:
the second cache-line address sequentially precedes the one of the first cache-line addresses; and
the third cache-line address sequentially precedes the second cache-line address.

15. The caching memory system of claim 10, wherein the address memory comprises a first-in, first-out queue.

16. The caching memory system of claim 10, wherein the address memory comprises a content-addressable memory.

17. A computer system, comprising:
at least one processor;
a main memory;
a cache memory coupled to the main memory and the at least one processor;
an address memory configured to hold a plurality of cache-line addresses; and
control logic configured to:
store a first cache-line address of each of a plurality of data requests from the at least one processor into the address memory, wherein each of the plurality of data requests resulted in a cache miss at the cache memory;
compare a second cache-line address of a next data request from the at least one processor, wherein the control logic is connected behind the cache memory such that the control logic is able to detect the next data request if the next data request resulted in a cache miss at the cache memory, but the control logic is unable to detect the next data request if the next data request resulted in a cache hit at the cache memory; and
if the second cache-line address of the next data request detected by the control logic is adjacent to one of the first cache-line addresses, pre-fetch into the cache memory data associated with a third cache-line address adjacent to the second cache-line address.

18. The method of claim 1, wherein storing the first cache-line addresses in the address memory comprises storing non-sequential first cache-line addresses, and
wherein comparing the second cache-line address comprises comparing the second cache-line address to the non-sequential first cache-line addresses in the address memory.

19. The method of claim 2, further comprising:
receiving, by the cache memory, a further data request having a fourth cache-line address that results in a cache hit at the cache memory, wherein the further data request is hidden from the control logic as a result of the cache hit.

20. The caching memory system of claim 10, wherein the first cache-line addresses stored in the address memory are non-sequential first cache-line addresses, and where the control logic is configured to compare the second cache-line address by comparing the second cache-line address to the non-sequential first cache-line addresses in the address memory.

21. The caching memory system of claim 11, wherein the cache memory is configured to further receive a further data request having a fourth cache-line address that results in a cache hit at the cache memory, wherein the further data request is hidden from the control logic as a result of the cache hit.

22. The computer system of claim 17, wherein the first cache-line addresses stored in the address memory are non-sequential first cache-line addresses, and where the control logic is configured to compare the second cache-line address by comparing the second cache-line address to the non-sequential first cache-line addresses in the address memory.

23. The computer system of claim 17, wherein the control logic is further configured to store the second cache-line address that resulted in a cache miss into the address memory as one of the first cache-line addresses, and
wherein the cache memory is configured to receive a further data request having a fourth cache-line address that results in a cache hit at the cache memory, wherein the further data request is hidden from the control logic as a result of the cache hit.

24. The computer system of claim 17, wherein the control logic is connected to a link between the cache memory and main memory.

* * * * *